(12) United States Patent
Bellrose et al.

(10) Patent No.: US 11,017,359 B2
(45) Date of Patent: May 25, 2021

(54) DETERMINING VALIDITY OF SERVICE RECOMMENDATIONS

(71) Applicant: International Business Machines Corporation, Armonk, NY (US)

(72) Inventors: Schayne Bellrose, Poughkeepsie, NY (US); Pasquale A. Catalano, Wallkill, NY (US); Jerry Chuaypradit, Monroe, NY (US); Andrew Crimmins, Montrose, NY (US); Preston Lane, Poughkeepsie, NY (US); Juan Merchan, Poughkeepsie, NY (US); Rorie Paul Reyes, Kingston, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 308 days.

(21) Appl. No.: 15/716,767

(22) Filed: Sep. 27, 2017

(65) Prior Publication Data

US 2019/0095873 A1  Mar. 28, 2019

(51) Int. Cl.
*G06Q 10/00* (2012.01)
*G06Q 30/00* (2012.01)
*G06Q 10/06* (2012.01)

(52) U.S. Cl.
CPC ......... *G06Q 10/20* (2013.01); *G06Q 10/0639* (2013.01); *G06Q 30/018* (2013.01)

(58) Field of Classification Search
CPC ... G06Q 10/20; G06Q 10/0639; G06Q 30/018
See application file for complete search history.

(56) References Cited

U.S. PATENT DOCUMENTS

| 8,131,417 B2 * | 3/2012 | Picard | G06Q 10/06 701/29.1 |
| 2002/0059075 A1 * | 5/2002 | Schick | B61L 27/0094 701/31.4 |

(Continued)

FOREIGN PATENT DOCUMENTS

CN  103412918 B  7/2016

OTHER PUBLICATIONS

N. Nagarathna, M. Indiramma and J. S. Nayak, "Optimal Service Selection Using Trust Based Recommendation System for Service-Oriented Grid," 2012 International Symposium on Cloud and Services Computing, Mangalore, 2012, pp. 101-106, doi: 10.1109/ISCOS.2012.22. (Year: 2012).*

(Continued)

*Primary Examiner* — Carrie S Gilkey
(74) *Attorney, Agent, or Firm* — Cantor Colburn LLP; Teddi Maranzano

(57) ABSTRACT

Embodiments include techniques for determining the validity of service recommendations, where the techniques include receiving a service provider recommendation for a device from a service provider, and receiving device inputs and service provider inputs associated with the device. The techniques also include performing an input analysis on the device inputs to determine a predicted recommendation, and determining a trust level score for the service provider based at least in part on the service provider inputs, and comparing the service provider recommendation and the predicted recommendation. Techniques include performing, based at least in part on the trust level score, a value analysis and a severity analysis, and generating a recommended action based at least in part on the value analysis and the severity analysis.

6 Claims, 10 Drawing Sheets

(56) References Cited

U.S. PATENT DOCUMENTS

| | | | |
|---|---|---|---|
| 2006/0212359 A1* | 9/2006 | Hudgeon | G06Q 10/063 705/7.11 |
| 2008/0312988 A1* | 12/2008 | Trapp | G06Q 10/06 705/7.29 |
| 2012/0173315 A1 | 7/2012 | Martini et al. | |
| 2016/0078521 A1 | 3/2016 | Koymans et al. | |
| 2016/0234079 A1 | 8/2016 | Lee et al. | |

OTHER PUBLICATIONS

List of IBM Patents or Patent Applictions Treated as Related; (Appendix P), Filed Nov. 7, 2017, 2 pages.
Schayne Bellrose, et al., Pending U.S. Appl. No. 15/805,211 entitled "Determining Validity of Service Recommendations," filed with the U.S. Patent and Trademark Office Nov. 7, 2017.

* cited by examiner

| Service Action | Trustworthiness | Results |
|---|---|---|
| High | Low | Yes |
| High | High | Yes |
| Low | High | Yes |
| Low | Low | No |

| Value | Severity | Results |
|---|---|---|
| High | Low | Yes |
| High | High | Yes |
| Low | High | Yes |
| Low | Low | No |

DETERMINING VALIDITY OF SERVICE RECOMMENDATIONS

BACKGROUND

The present invention generally relates to validity tools, and more specifically, to determining the validity of service recommendations.

In today's environment, devices and equipment are used daily for commercial and personal applications. In order to extend the life of the device and equipment, regular service according to maintenance schedules should be performed. Each device can have a specific set of services, including both planned and unplanned services, that need to be performed that is based on the model of the device, type of device, the age of the device, usage of the device, among other factors. As devices become more complex the required maintenance for the devices can increase and the type of service may require more skill.

SUMMARY

Embodiments of the present invention are directed to a computer-implemented method for determining the validity of service recommendations. A non-limiting example of the computer-implemented method includes receiving a service provider recommendation for a device from a service provider, and receiving device inputs and service provider inputs associated with the device. The methods also include performing an input analysis on the device inputs to determine a predicted recommendation, and determining a trust level score for the service provider based at least in part on the service provider inputs, and comparing the service provider recommendation and the predicted recommendation. Methods include performing, based at least in part on the trust level score, a value analysis and a severity analysis, and generating a recommended action based at least in part on the value analysis and the severity analysis.

Embodiments of the present invention are directed to a system for determining the validity of service recommendations. A non-limiting example of the system includes a storage medium, the storage medium being coupled to a processor, where the processor is configured to receive a service recommendation for a device from a service provider, and receive device inputs and service provider inputs associated with the device. The processor is also configured to perform an input analysis on the device inputs to determine a predicted recommendation, and determine a trust level score for the service provider based at least in part on the service provider inputs, and comparing the service provider recommendation and the predicted recommendation. The processor is configured to perform, based at least in part on the trust level score, a value analysis and a severity analysis, and generate a recommended action based at least in part on the value analysis and the severity analysis.

Embodiments of the invention are directed to a computer program product for determining the validity of service recommendations, the computer program product comprising a computer readable storage medium having program instructions embodied therewith. The program instructions are executable by a processor to cause the processor to perform a method. A non-limiting example of the method includes receiving a service provider recommendation for a device from a service provider, and receiving device inputs and service provider inputs associated with the device. The methods also include performing an input analysis on the device inputs to determine a predicted recommendation, and determining a trust level score for the service provider based at least in part on the service provider inputs, and comparing the service provider recommendation and the predicted recommendation. Methods include performing, based at least in part on the trust level score, a value analysis and a severity analysis, and generating a recommended action based at least in part on the value analysis and the severity analysis.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 6 depicts a service action and trust comparison table in accordance with one or more embodiments;

FIG. 9 depicts a value analysis and severity analysis table in accordance with one or more embodiments.

Figure 1:
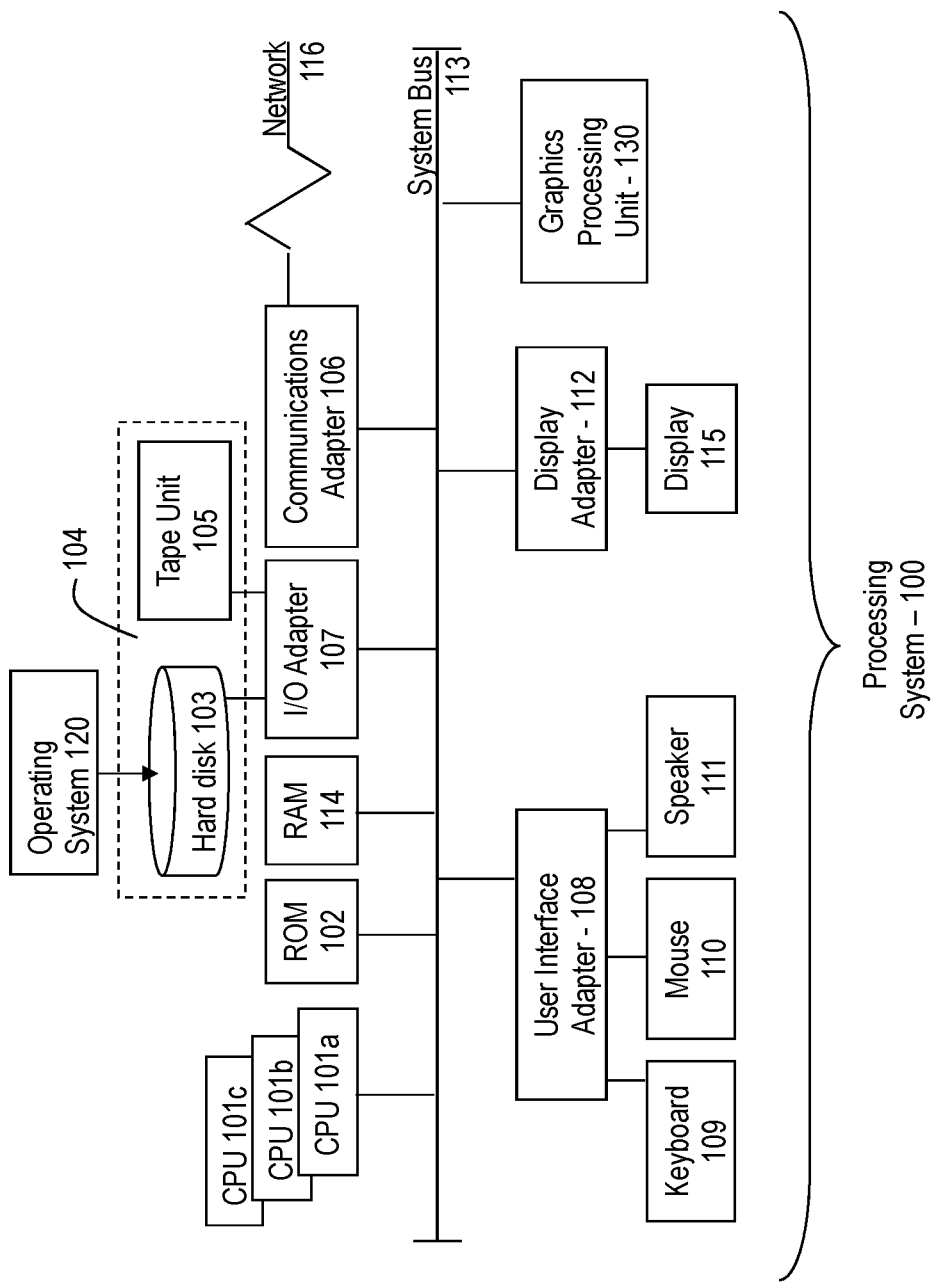
FIG. 1 is a block diagram illustrating one example of a processing system for practice of the teachings herein.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, consumer devices are becoming more advanced and complex and understanding how and when to service the devices is becoming a specialized skill. Consumers may not understand the complexities of their devices or whether their devices actually need the services being recommended by a skilled service provider. Service providers may take advantage of the consumer's limited knowledge to try to manipulate them into performing a service that may not be required, or at a cost that is not at the market rate. As consumers receive recommendations for various services from service providers, the techniques described herein provide a method for determining whether the recommended services are actually needed based on a plurality of inputs.

Turning now to an overview of the aspects of the invention, one or more embodiments of the invention address the above-described shortcomings of the prior art by providing a technique for validating service provider recommendations. In a non-limiting example, given the device model service data, device diagnostic/usage data and service provider trust index, combining the data to allow a system to predict the required service for the device. Subsequently, a recommendation is provided for a specific action to be taken by the user, and modify a service provider's trust index.

One embodiment of the present disclosure can use IBM Watson® including Watson™ application performance interfaces (API). In a non-limiting example the device analysis and service provider trust analysis can include, but is not limited to, Watson™ APIs. The data, such as but not limited to consumer reviews and social media sites/web pages, can be received and processed by the system using Watson™ AlchemyLanguage service to input the service provider's actual recommendation. In addition, Watson™ Discovery API can be used on a device diagnostic to predict the service required. In a different embodiment, other forms of natural language processing can be used.

The service provider's recommendation is then compared to the predicted recommendation. In one or more embodiments, a service provider's trust level score is determined based on one or more factors that are used to be representative of the trustworthiness of the service provider's recommendation. In the event the trust level has already been determined for a previous occasion, the trust level can be stored and searched in a table. If the service provider's recommended service matches the predicted service, then the trust level can be increased and action can be taken for the recommended service. If the provider's recommended service misses the predicted service, then the trust level is decreased and no action is taken for the recommended service. If the service provider's recommendation requires more than the predicted recommended service, and if the trust level is greater than or equal to the predetermined value, then an action can be taken for the provider's recommended services. Otherwise, no action is taken.

Techniques are provided to validate a recommended service from the service provider. Additionally, guidance can be provided to a user as to whether action should be taken according to the service provider's recommendation. Data can be collected for the user's device from several sources. For example, the sources include internal and/or external sensors, device profile, vendor recalls, knowledge databases, social platforms, etc. A service provider profile is created which can include data such as certifications, service records, consumer reviews, etc. Finally, analytics are used to determine the trustworthiness of the service provider, and whether or not the recommended service action is to be pursued.

In an example for an automobile, the validity of service recommendations tool/application running on a device detects a service provider's recommendation. After receiving the service provider's recommendation, the tool begins processing the automobile's service history, general issues for that specific make/model/year, the automobile's internal sensor/diagnostic data, the automobile's profile, the service provider's profile, and other local service facility profiles.

Using the example, a service provider has recommended replacing the vehicle thermostat, the data collected by the application finds that internal sensors have logged higher than average engine temperatures (but not high enough to trigger the check engine light (CEL)) compared to what was normal for the make/model/year automobile during the winter. The application also correlates the GPS/location data to their recent weather the model/make/year automobile has been exposed to and finds it highly probable that cold temperatures have kept the engine temperature below the CEL threshold.

At the same time, the application performs a sentiment analysis on the service provider's online profile/reviews such as Yelp®, Facebook®, Google® reviews. If the application trusts the service provider's recommendation, based at least in part on the sentiment analysis, a value analysis can be performed. The value analysis can reveal that the primary service provider's cost is average for a thermostat replacement from local automotive service facilities.

At the same time, the application runs a severity analysis and deems that an overheated engine is rated severity=3 (highest) because the damage that can be caused by that condition can be very costly and potentially dangerous for occupants. The tool/application makes a recommendation to act immediately to replace the thermostat at the current shop.

A user can be confident the decision of the validity of service recommendations tool/application has processed all of the available data related to the car and the service provider to determine that it is highly probable that the service provider's recommendation is valid.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 1.

Figure 2:
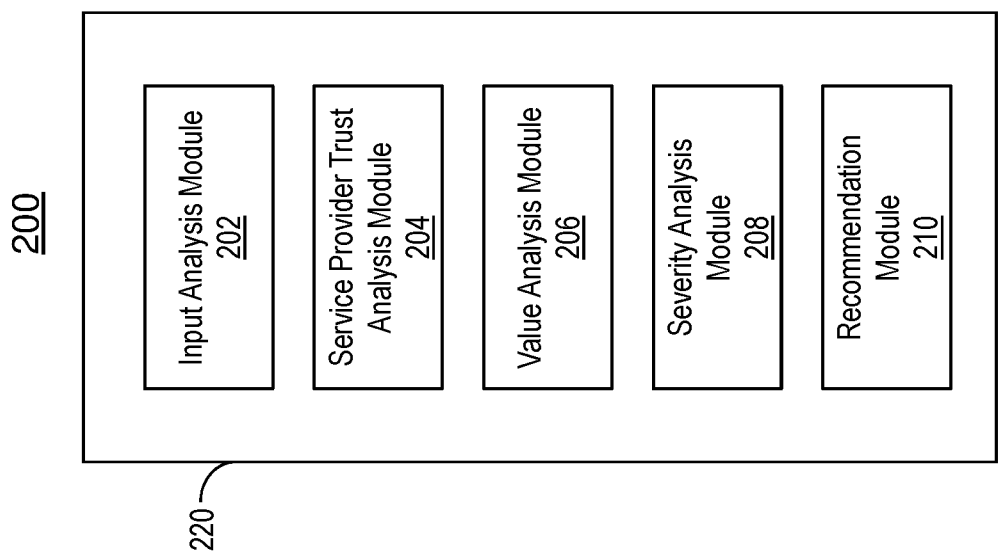
FIG. 2 depicts a block diagram of a system for determining the validity of service recommendations in accordance with one or more embodiments.

Referring to FIG. 2, the system 200 can be incorporated into one or more elements in the system 100 of FIG. 1. In addition, one or more modules of the system 200 can be represented by the components in the FIG. 1. In one or more embodiments, a processor 220 includes a plurality of modules for executing the validity analysis.

The system 200 includes an input analysis module 202. In one or more embodiments, the input analysis module 202 is configured to receive the device inputs. The input analysis module 202 determines whether the service provider recommendation is a valid recommendation based on the device inputs. The system 200, includes a service provider trust analysis module 204 which is configured to calculate a trust level score for the service provider based on the received service provider inputs. In addition, the system 200 includes a value analysis module 206. Responsive to determining the service provider recommendation is trustworthy (trust level scores exceeds a configurable threshold), the value analysis module 204 determines whether the cost for the service is within a price range submitted by the user. A severity analysis module 208 can be included into the system 200. Also, responsive to determining the service provider recommendation is trustworthy, the severity analysis module 208 determines the severity, or how critical or damaging, the recommended service is to the system if the service is not performed.

A recommendation module 210 can be included in the system 200. The recommendation module 210 determines whether to provide an indication to the user that the recommended service has been validated by the system 200 and the recommended service should be performed by balancing the value analysis and the severity analysis that has been performed. Otherwise, the recommendation module 210 can provide an indication to not perform the recommended service.

Figure 3:
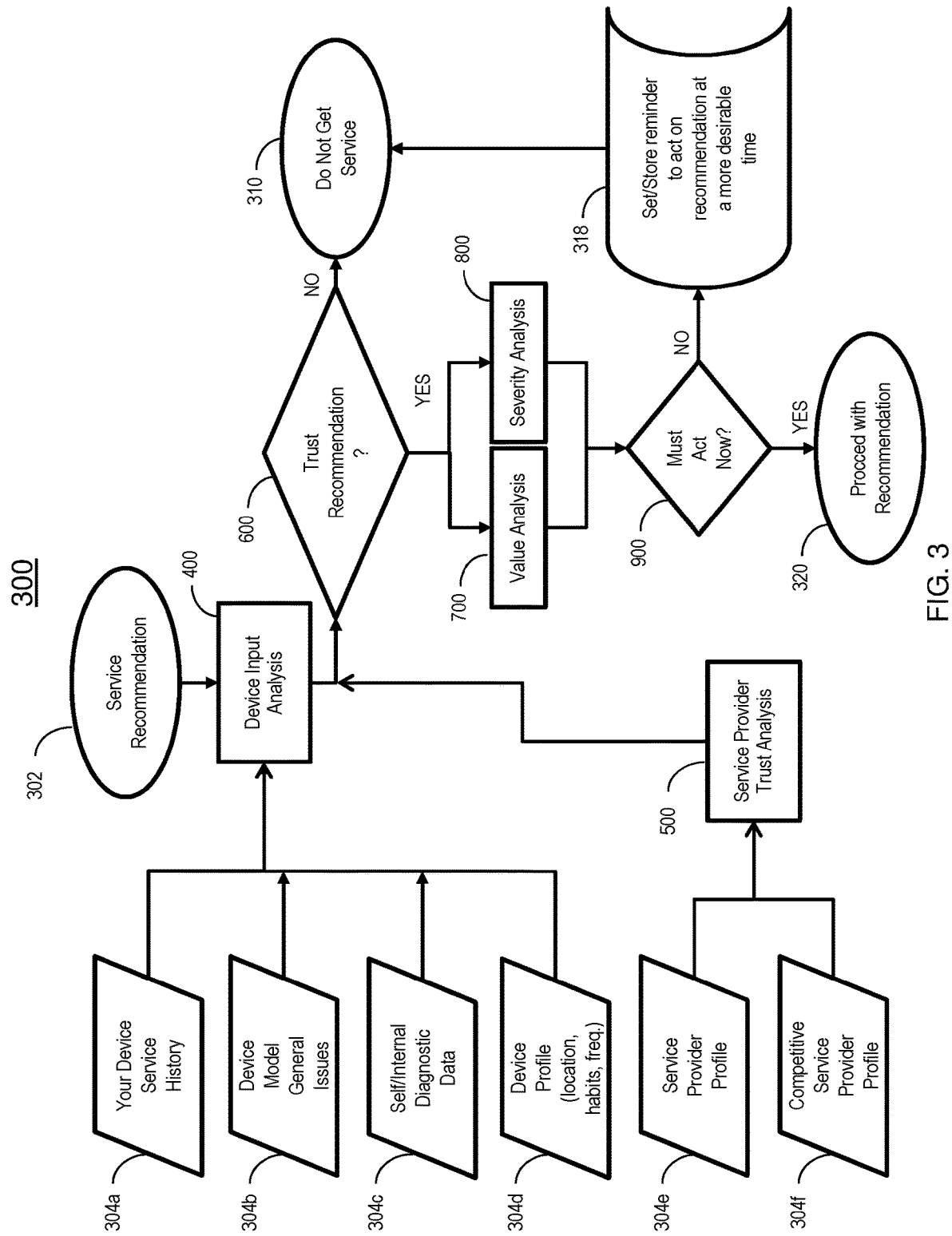
FIG. 3 depicts a flow chart for determining the validity of service recommendations in accordance with one or more embodiments.

Now referring to FIG. 3, a method 300 for determining the validity of service recommendations in accordance with one or more embodiments is shown. The method begins at block 302 by receiving a service recommendation from a service provider for a service for a given device. In a non-limiting example, the device can be an automobile. The service provider recommendation can be input into the system by a plurality of techniques. For example, the application can detect the audio from the service provider and process the data to determine the recommended service.

The method 300 also analyzes one or more device and service provider inputs. For example, blocks 304a, 304b, 304c, 304d, 304e, and 304f, provide inputs for the input analysis performed at block 306. Blocks 304a, 304b, 304c, and 304d represent device inputs and blocks 304e and 304f represent service provider inputs. In particular, block 304a includes the device service history. If the service history for the device indicates the particular service was not performed as scheduled, the service provider's recommendation can be corroborated.

Block 304b includes device model issues. The device model issues can be determined based on recalls, analyzing reviews and blogs, etc. For example, a database can be accessed according to determine the recalls that are associated with a particular device. In addition, the device model issues can be crowdsourced data on the specific model's shortcomings/vulnerabilities, etc.

Block 304c includes self/internal diagnostic data. Devices can include diagnostic tools, sensors, debuggers, and other tools to perform a scan of the device to determine potential issues. If the device model issues match the service provider's recommendation, the recommendation can be corroborated.

In one or more embodiments, the device inputs include self-diagnostic or internal diagnostic data. For example, data from one or more plurality of device sensors, on-board diagnostics data, etc. In an automobile example, the OBDII diagnostic information can be used and input into the application. In addition, other onboard sensors/detectors can be used.

Block 304d includes the device profile. The device profile can include information related to the device's location data, usage frequency, habits, duration of use, etc. For example, an automobiles location can be tracked and used to determine whether the automobile is driven in an icy and cold region, or a rainy and humid region. In addition, devices can track the frequency of usage to determine how often the device is used and the intensity of its utilization. If the service provider recommendation is associated with the issues that are based on the device profile, the service provider's recommendation can be corroborated.

Block 304e includes service provider profile. A service provider's profile can include information regarding the service provider's area of expertise, services offered, credentials and certifications acquired, customer service reviews, and the like. Block 304f includes competitive service provider profile. The competitive service profile 304f can include one or more competitors' information to determine the suggested option for the user. This includes crowdsourced data on the reliability and trustworthiness of the service provider. In one or more embodiments, a sentiment analysis can be performed on the crowdsourced data, where keywords or a combination of words are detected in the data to determine the trustworthiness of the service provider. For example, positive reviews can indicate a good service and negative reviews can indicate a bad service. This information can be used to generate a score to assign a trustworthy level to the service provider.

At block 400 a device input analysis is performed. Further details of the input analysis are provided in FIG. 4 described below. The device inputs are received to perform the input analysis 400. The device inputs can include device service history, device model issues, diagnostic data, device profile information, etc. The device service history can include information of the services and/or maintenance that have been performed on the device. At block 500 a service provider trust analysis is performed. As shown, the service provider trust analysis receives the service provider profile and the competitive service provider profile to perform the service provider trust analysis. The results of the analysis are provided to the decision block 600 for further processing. Decision block 600 includes determining whether the service provider recommendation should be trusted based on the input analysis and the service provider trust analysis. In one or more embodiments, the service provider recommendation is corroborated to determine if the recommendation is to be trusted. If it is determined that the service provider recommendation should not be trusted, block 310 indicates to the user the service should not be obtained or performed. Otherwise, the processing continues to block 312 and block 314.

Figure 7:
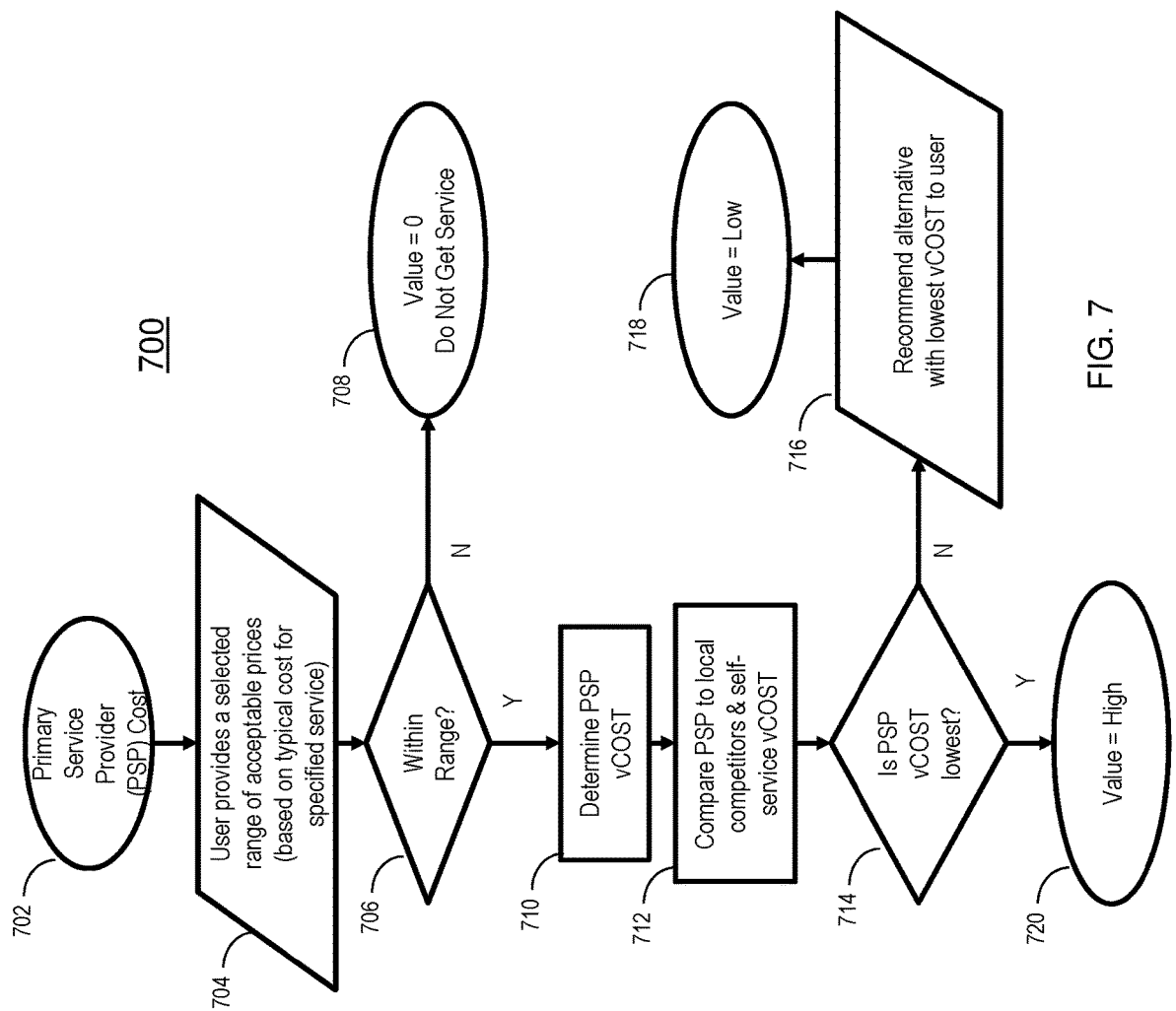
FIG. 7 depicts a flow chart for a value analysis in accordance with one or more embodiments.

Block 700 provides performs the value analysis where further details of the value analysis are provided in FIG. 7. The value analysis determines the user's willingness to pay for a particular service. Block 800 provides for the severity analysis where further details of the severity analysis are provided in FIG. 8. The severity analysis determines the potential harm and/or damage to the user or device that can arise if the service recommendation is not acted upon.

Based on the results from the value analysis and the severity analysis the decision block 900 determines whether to proceed with the recommendation. If it is determined that action should not be taken, the process continues to block 318 to set/store a reminder to act on the service provider recommendation at another time. If it is decided that an action should be taken, the processing proceeds to block 320 and indicates to the user to take an action.

Figure 4:
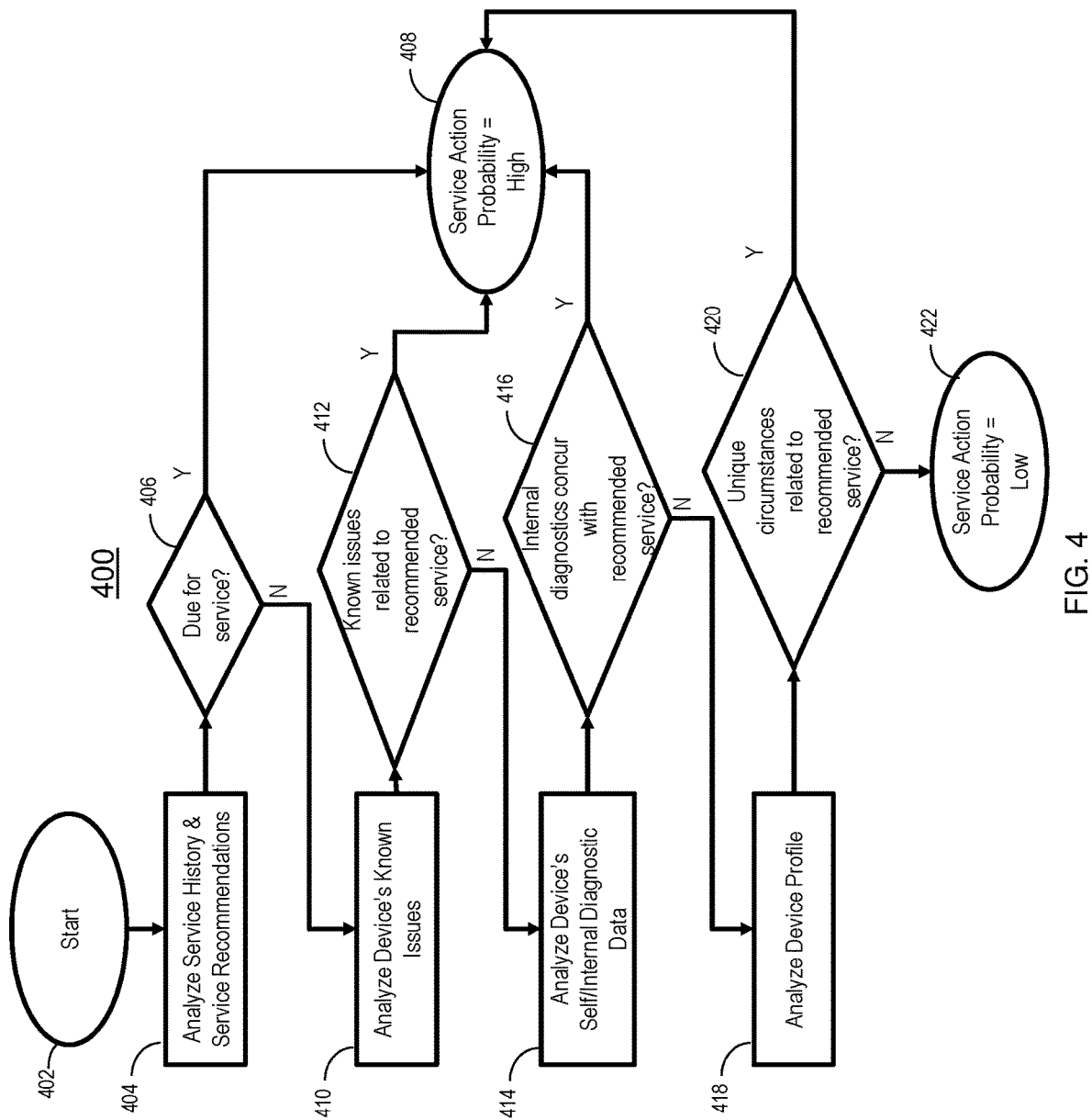
FIG. 4 depicts a flow chart for a device input analysis in accordance with one or more embodiments.

Now referring to FIG. 4, the input analysis 400 for determining the validity of service recommendations in accordance with one or more embodiments is provided. The input analysis 400 begins at block 402 and continues to block 404 which analyzes the service history and service recommendations for the particular device. Block 406 determines from the service history whether the recommended service is due for service. If so, block 408 returns a High value (used in the decision block 308) for the service action probability. If not, block 410 provides analyzing known issues for the device such as recalls.

Block 412 provides if known issues related to the recommended service are discovered, then processing continues to block 408. If not, the processing continues to block 414 to analyze the device's self/internal diagnostic data.

Block 416 provides that if the internal diagnostics concur with the recommended service the processing continues to block 408. If not, the processing continues to block 418 to analyze the device profile.

Block 420 provides determining circumstances related to the recommended service if so the processing continues to block 408. If not, the processing continues to block 422 indicating the service action probability is Low.

Figure 5:
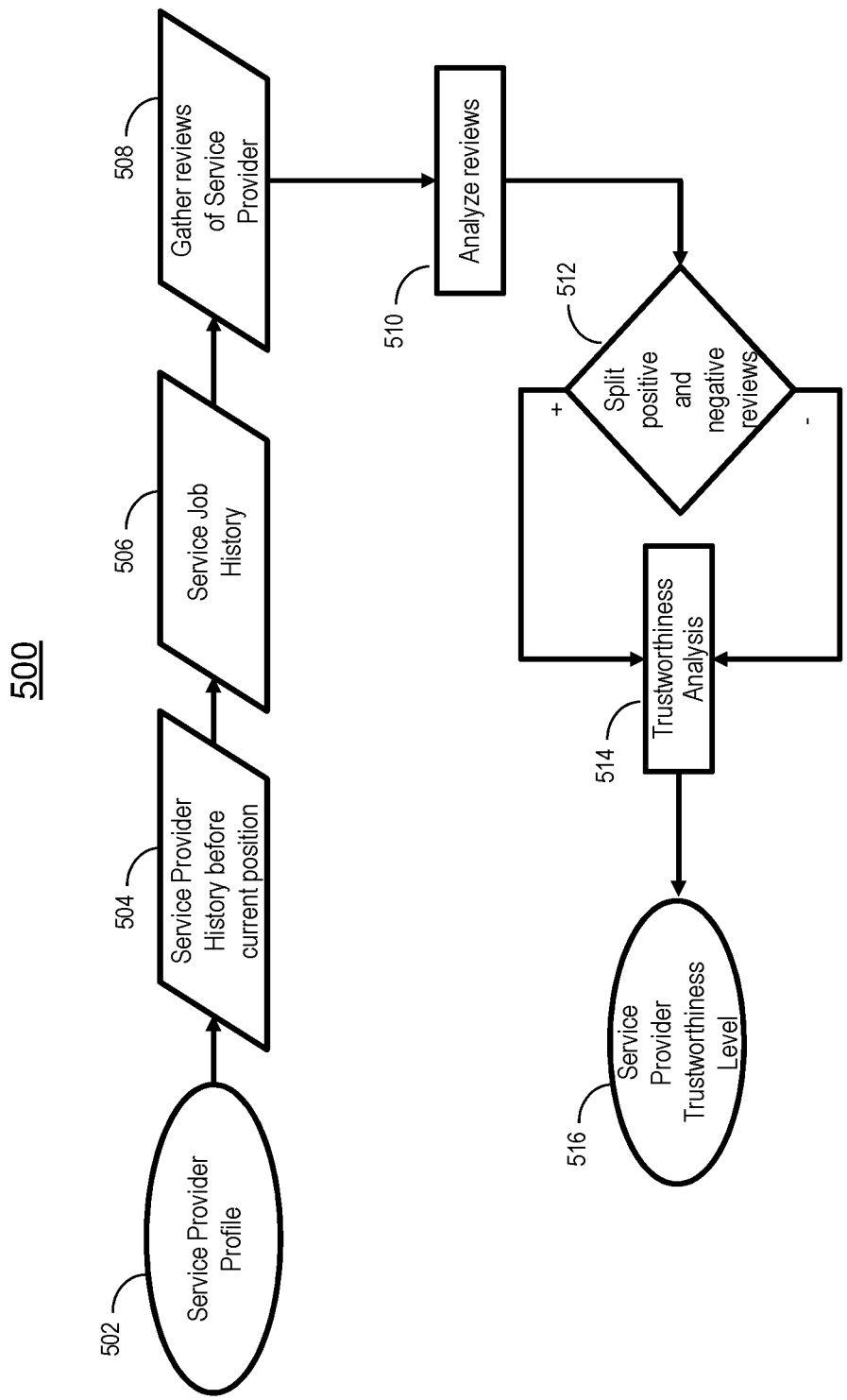
FIG. 5 depicts a flow chart for a service provider trust analysis in accordance with one or more embodiments.

Now referring to FIG. 5, a flow chart 500 for determining the validity of service recommendations in accordance with one or more embodiments is shown. Block 502 provides receiving a service provider profile. Block 504 provides for receiving the service provider history, where the history can include information regarding the service provider's prior work history. The work history describes work that has been performed and completed by the service provider. In addition, the information can also include training, certifications, and/or degrees prior to the provider's current position.

Block 506 includes analyzing the service job history. The service job history consists of all assignments performed by the service provider to outline the level of experience in a particular field of service. For example, a particular field of service can include a type of car, a brand of car, systems used in a car, and the like. It is to be understood other fields of service and devices can be analyzed such as computers, manufacturing equipment, appliances, etc.

Block 508 provides collecting reviews about the service provider. Reviews can be collected from clients who used the particular service provider. In addition, a search for user reviews and/or social media sites related to the recommended service and/or service provider can be performed. The keywords that are used for the search can be related to one or more of the device, the service provider name, the service being performed, parts used in the service, etc. It is to be understood that other keywords can be used to perform the search.

Block 510 provides analyzing the reviews. The reviews can be analyzed by using a sentiment analysis. In one or more embodiments, Watson™ Alchemy Language service is used to decipher the comments made towards the service provider in a manner that can help the user understand the reasons behind the positive and negative reviews.

Block 512 provides splitting the positive and negative reviews of those that have been analyzed. In one or more embodiments, the negative and positive reviews are analyzed to determine a trustworthiness value. The negative reviews can be used to reduce a trust level score and the positive reviews can be used to increase the trust level score. Different techniques can be used to track the trust level score such as incrementing/decrementing a score by 1 or some other value. The scores can be weighted based on the relatedness to the recommended service or the confidence of a particular reviewer such as a verified reviewer or an expert reviewer for the service.

Block 514 provides performing the trustworthiness analysis. Block 516 provides determining the service provider trustworthiness level. A service provider trustworthiness level is determined and used in determining whether to trust the service provider. The trust level score can be determined to be high based on the majority of the reviews returning a good review or the trust level score having exceeded some configurable threshold. If the majority of the reviews are good or the threshold has been exceeded, a high value can be determined. Otherwise, a low value is returned. It is to be understood that other techniques for using the score can be used.

Now referring to FIG. 6, a table 600 for determining the validity of service recommendations in accordance with one or more embodiments is shown. The table 600 includes 3 columns "Service Action," "Trustworthiness," and "Results." In an embodiment, the "Service Action" probability indicates whether action related to the recommended service should be taken by the user. For example, a critical service related to an automobile's transmission or engine would be marked High, while the automobile's windshield washer fluid level is low can be marked Low. The "trust level value" is determined by corroborating the service provider's recommendation with a predicted recommendation.

In one or more embodiments, the "Service Action" value and the "Trustworthiness" value are used to determine whether immediate action should be taken. As shown in the table 600, if the Service Action probability is High and the trustworthiness value is Low, the recommendation action results in recommending to the user to take action. If the Service Action probability is High and the Trustworthiness is High, it will be recommended to the user to take action. If the Service Action is Low and the trustworthiness is High, the result is to recommend to the user to take action. In the event the Service Action and the service provider's Trustworthiness are both Low, the recommended action to the user is to not take action. In other embodiments, different sets of combinations can lead to different outcomes.

Now referring to FIG. 7, a value analysis 700 is shown. Block 702 includes receiving a primary service provider (PSP) cost. For example, the primary service provider can be the initial service provider that has diagnosed and provided a service recommendation for the particular device. In one or more embodiments, one or more service providers' costs can be compared to determine the lowest cost and best value for the user. In one or more embodiments, cost information is received for the given service from the service provider. In a non-limiting example, a value analysis module can receive the cost information using a speech-to-text function, the pricing information can be searched online for a service in the service provider's website and/or reviews for a service, manually entering the price.

Block 704 includes receiving a selected range of prices for the specific service. In one or more embodiments, the user can submit a percentage from a target price to indicate the acceptable price range. Block 706 includes determining whether the PSP cost is within the acceptable price range entered by the user. If not, the processing ends at block 708 which indicates to the user to not get the recommended service and sets the Value=0. If the PSP cost is within the acceptable range, the processing continues to block 710 to determine the PSP vCOST.

The cost from the service provider is compared to the cost range provided by the user. In one or more embodiments, the optimal value for a given service provider (vCOST) is a value based on the cost of service (COST) and trust value for the given service provider (TRUST), wherein the value analysis module uses the formula vCOST=COST−(COST*TRUST). The lowest vCOST, calculated across multiple service providers, is determined to be the more optimal value.

In one or more embodiments, the trust value can be input by the user. The trust value can range between 0.1 and 0.99 wherein the trust value indicates the user's willingness to and/or confidence in performing the service. For example, 0.1 indicates a very low confidence and 0.99 indicates a very high confidence.

Block 712 includes comparing the PSP vCOST to other competitors' costs (other service provider). The vCOST that are compared are for a similar service for a similar device. For example, a specific vehicle model can be compared or a specific vehicle type, such as a compact, 4-cylinder vehicle, can be compared.

In one or more embodiments, the competitors can be determined by the locality from the user or the primary service provider. In other embodiments, the PSP vCOST is also compared to a self-service vCOST. The self-service vCOST collects cost information associated with the parts necessary to perform the service. A search can be performed on the Internet to locate price parts. In some embodiment, the average of the prices of a number of entries returned in the search can be used as the price for calculating the vCOST. For example, the price for the first 5, 10, 15, etc. entries can be used to determine the prices for each of the parts. The self-service vCOST also includes a user skill/trust level for performing the service which can be input by the user.

Block 714 determines whether the PSP vCOST is the lowest cost of the one or more determined vCOSTs. If so, block 720 indicates a High value. If not, block 716 includes recommending an alternative with the lowest vCOST to the user. Block 718 continues and returns a Low value.

Figure 8:
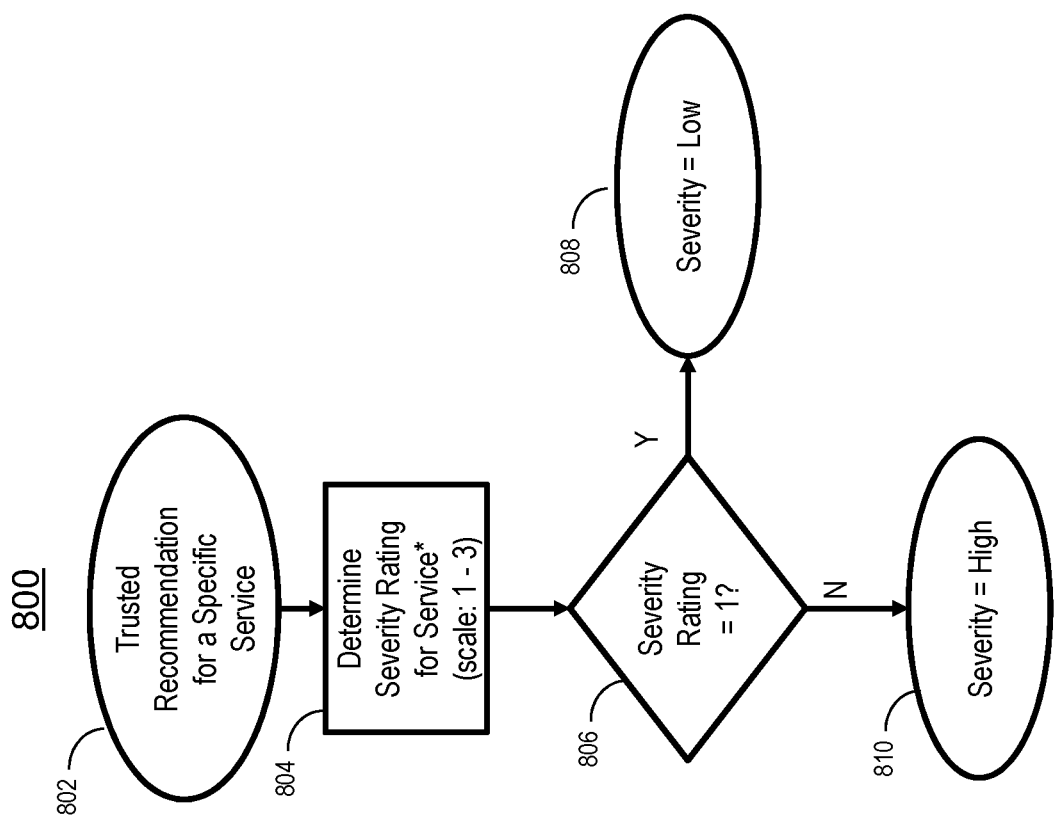
FIG. 8 depicts a flow chart for a severity analysis in accordance with one or more embodiments.

Now referring to FIG. 8, a severity analysis 800 for determining the validity of service recommendations in accordance with one or more embodiments is shown. At block 802, the severity analysis commences in response to determining a trusted recommendation for a specific service. Block 804 includes determining the severity rating for the service.

Responsive to determining a trustworthy recommendation, the severity analysis is performed to determine the potentially dangerous conditions to the user or damaging to the device. In one or more embodiments, a severity analysis is executed by a processor or processing module such as severity analysis module 206. In one example, a look-up table can be used to determine a severity rating. The scale for the severity rating can be based on a scale of 1-3 where "1" is assigned as the least severe and "3" is assigned the most severe. The look-up table can be used to map known issues to a severity rating. For example, in the automobile example, services pertaining to the transmission and/or engine can be deemed severe "3." Services related to a window motor can be rated at 2, while gas that is less than the half a tank is rated "1" in severity.

At the decision block 806, it is determined whether the severity rating for the service is equal to "1." If so, the process determines the severity rating is Low as shown in block 808. Otherwise, the severity rating, at block 810, is determined to be High. In another embodiment, a severity with a score of 2 or lower can set the severity rating to Low.

In another embodiment, the severity rating can be defined for a specific problem where data on the severity is crowd-sourced. For example, the severity can be gleaned from user reviews from review sites and/or social media. After analyzing a configurable threshold number of reviews a severity rating can be determined.

In one or more embodiments, if the severity rating is not equal to 1, then the recommended service by the service provider is deemed severe enough that the system would recommend the user to act immediately on the service provider's recommendation. Therefore, returning a High severity rating. Otherwise, the severity rating is Low.

Now referring to FIG. 9, table 900 for determining the validity of service recommendations in accordance with one or more embodiments is shown. The table 900 includes a "Value" column, "Severity" column, and a "Results" column. In the event the value returned from the value analysis is High and the severity rating is Low, the process continues to recommend the service recommended by the service provider.

In one or more embodiments, the value analysis and the severity analysis can determine whether an action should be taken. If the value analysis returns a High result and the severity analysis returns a Low result, the system will recommend continuing with recommended service. If the value analysis and the severity analysis both return a High result, the system will recommend continuing with recommended service. If the value analysis returns a low result and the severity analysis returns a High result, the system will recommend continuing with recommended service. If the value analysis and the severity analysis both return a low result, the system will not recommend continuing with recommended service.

Figure 10:
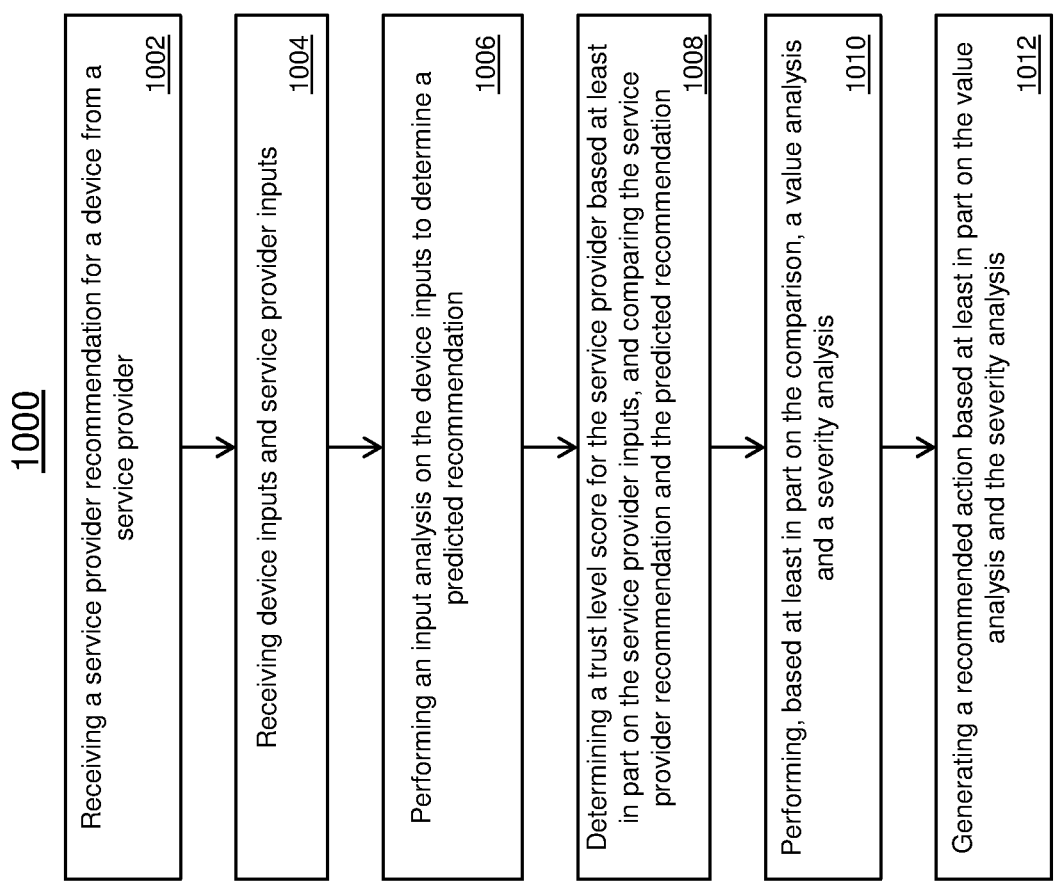
FIG. 10 depicts a flow chart for determining the validity of service recommendations in accordance with one or more embodiments.

Now referring to FIG. 10, a method 1000 for determining the validity of service recommendations in accordance with one or more embodiments is shown. Block 1002 includes receiving, via a processor, a service provider recommendation for a device from a service provider. In one or more embodiments, an application being executed on a device receives the service provider recommendation by detecting the audio of the service provider. In some embodiments, the service provider recommendation can be manually entered into the application by a user.

Block 1004 includes receiving device inputs and service provider inputs. In one or more embodiments, the device inputs and the service provider inputs. The device inputs and the service provider inputs can be collected from a plurality of sources. The device inputs can include the device service history, device model general issues, self/internal diagnostic data, device profile, and the like. The service provider inputs can include a service provider profile, competitor service provider profile, etc.

Block 1006 includes performing an input analysis on the device inputs to determine a predicted recommendation. The device inputs are used to predict a service recommendation based on the symptoms and data. Responsive to receiving the inputs, an input analysis is performed on the inputs to determine a predicted service recommendation and a trust level score for the service provider. The predicted service information and the trust level score are used to corroborate the service provider recommendation.

Block 1008 includes determining a trust level score for the service provider based at least in part on the service provider inputs, and comparing the service provider recommendation and the predicted recommendation. In one or more embodiments, the trust level score is determined by performing sentiment and credibility analysis on reviews of the service provider. If a review is analyzed and it is determined to be related to the service provider the review can be analyzed. If the review provides positive feedback the score can be increased. If the review provides negative feedback the score can be decreased. The resulting score can be used as the trust level score of the service provider. In other embodiments, reviews only related to the particular service are analyzed and considered when determining the score. In addition, the trust level score factors in the service provider history and service job history.

Block 1010 includes performing, based at least in part on the trust level score, a value analysis, and a severity analysis. In one or more embodiments, after it is determined to trust the service provider recommendation, a value analysis, and a severity analysis are performed. In some embodiments, the value analysis and the severity analysis are performed simultaneously.

The value analysis is used to determine whether the value of the recommended service is in alignment with the user's willingness to pay. In addition, other competitors offering similar services are considered when determining the value. A self-service cost can also be calculated and factored in when determining the course of action to take.

The severity analysis determines the criticality of performing the recommended services. The severity analysis can be determined from a database mapping the severity of specific services to a score, such as using predefined original equipment manufacturer OEM specifications. The severity can also be determined based on crowdsourced information.

Block 1012 includes generating a recommended action based at least in part on the value analysis and the severity analysis. The recommended action is provided to a user to either take an action to remedy the service provider recommendation or not, based on the trustworthiness level of the service provider, the value analysis, and the severity analysis. In the event the user decides to take action, a reminder to act on the recommendation can be scheduled or added to a user's calendar for a later date and time.

The techniques described herein provide for real-time analysis of the validity of a service provider's recommendation by weighing cost, trustworthiness, and severity analysis to help a user determine whether or not to act immediately on a recommendation for service on a device. Also, the techniques provide for collecting structured and unstructured data to build a service provider's credibility index that can be shared among a plurality of users.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A system for determining validity of service recommendations, the system comprising:
   a storage medium, the storage medium being coupled to a processor;
   the processor configured to:
      receive a service provider recommendation for a device from a service provider;
      receive device inputs and service provider inputs;
      determine a predicted recommendation based on the device inputs;
      determine a trust level score for the service provider based at least in part on the service provider inputs, and comparing the service provider recommendation from the service provider and the predicted recommendation of the system;
      perform, based at least in part on the trust level score, a value analysis and a severity analysis, wherein the value analysis comprises:
         receiving a service provider cost for a service;
         receiving, from a user, cost information for the service;
         receiving a trust value; and
         determining a vCOST value for the service of the service provider recommendation, wherein the vCOST value is a value calculated according to the following equation:

$$vCOST = COST - (COST * TRUST)$$

wherein COST is the service provider cost for the service, and TRUST is the trust value,
         responsive to determining the vCOST value for the service provider recommendation, determine a vCOST value for at least one secondary service provider and a vCOST value for a self-service option, wherein the vCOST value for the at least one secondary service provider is a value calculated using a cost for the service for the at least one secondary service provider and the trust value, wherein the vCOST value for the self-service option is a value calculated using a cost for the self-service option and the trust value;
         compare the vCOST value for the service provider to the vCOST value for the at least one secondary service provider and vCOST value for the self-service option; and
         select a lowest vCOST value based at least in part on the comparison;
      generate a recommended action based at least in part on the value analysis and the severity analysis;
      provide an indication, wherein the indication includes the generated recommended action and a recommendation to perform the generated recommended action based at least in part on the value analysis and the severity analysis, wherein the recommendation to perform the generated recommended action includes a result of the value analysis and a result of the severity analysis, otherwise provide an indication to not perform the generated recommended action based at least in part on the value analysis and the severity analysis, wherein the indication to not perform the generated recommended action includes the result of the value analysis and the result of the severity analysis; and
      performing the recommended action.

2. The system of claim 1, wherein determining the trust level score is based at least in part on the service provider inputs and analyzing reviews including at least one of service provider reviews or social media reviews that are associated with the service provider.

3. The system of claim 1, wherein the severity analysis includes searching, based on the trust level score, a table for a severity rating for the service; and
   determining the severity rating.

4. A computer program product for determining validity of service recommendations, the computer program product comprising:
   a computer readable storage medium having stored thereon program instructions executable by a processor to cause the processor to:
      receive a service provider recommendation for a device from a service provider;
      receive device inputs and service provider inputs;
      determine a predicted recommendation based on the device inputs;
      determine a trust level score for the service provider based at least in part on the service provider inputs, and compare the service provider recommendation from the service provider and the predicted recommendation;
      perform, based at least in part on the trust level score, a value analysis and a severity analysis, wherein the value analysis comprises:
      receiving a service provider cost for the service;
      receiving, from a user, cost information for the service;
      receiving a trust level; and
      determining a vCOST value for the service of the service provider recommendation, wherein the vCOST value is a value calculated according to the following equation:

$$vCOST = COST - (COST * TRUST)$$

wherein COST is the service provider cost for the service and TRUST is the trust value; responsive to determining the vCOST value for the service provider recommendation, determining a vCOST value for at least one secondary service provider and a vCOST value for a self-service option, wherein the vCOST value for the at least one secondary service provider is a value calculated using a cost for the service for the at least one secondary service provider and the trust value, wherein the vCOST value for the self-service option is a value calculated using a cost for the self-service option and the trust value;
      compare the vCOST value for the service provider to the vCOST value for the at least one secondary service provider and vCOST value for the self-service option; and select a lowest vCOST value based at least in part on the comparison;

generate a recommended action based at least in part on the value analysis and the severity analysis; and provide an indication, wherein the indication includes the generated recommended action and a recommendation to perform the generated recommended action based at least in part on the value analysis and the severity analysis, wherein the recommendation to perform the generated recommended action includes a result of the value analysis and a result of the severity analysis, otherwise provide an indication to not perform the generated recommended action based at least in part on the value analysis and the severity analysis, wherein the indication to not perform the generated recommended action includes the result of the value analysis and the result of the severity analysis; and perform the recommended action.

5. The computer program product of claim 4, wherein determining the trust level score is based at least in part on the service provider inputs and analyzing reviews including at least one of service provider reviews or social media reviews that are associated with the service provider.

6. The computer program product of claim 4, wherein the severity analysis includes searching, based on the trust level score, a table for a severity rating for the service; and determining the severity rating.

* * * * *